Jan. 20, 1959

P. LIPPKE 2,870,403

DEVICE FOR DIELECTRICALLY MEASURING THE
THICKNESS OF MOVING WEBS OF MATERIAL

Filed May 6, 1953

INVENTOR
PAUL LIPPKE

BY Burgess, Dinklage & Sprung

ATTORNEY

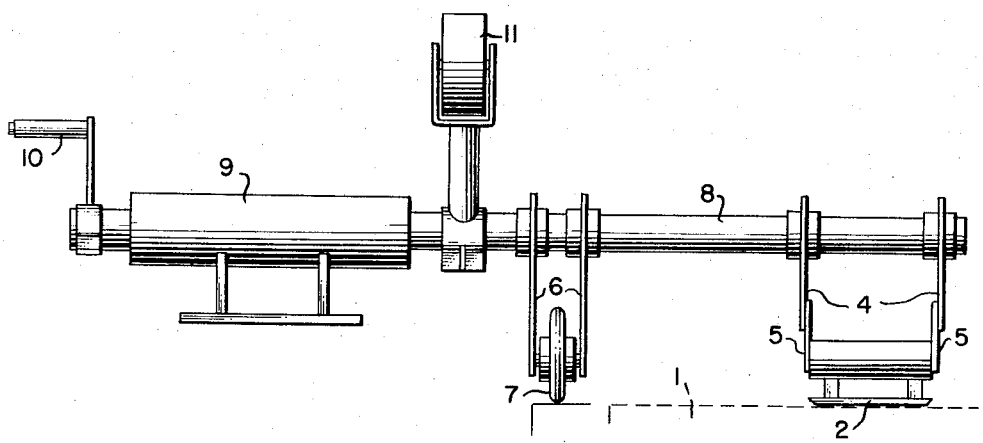
FIG. 2
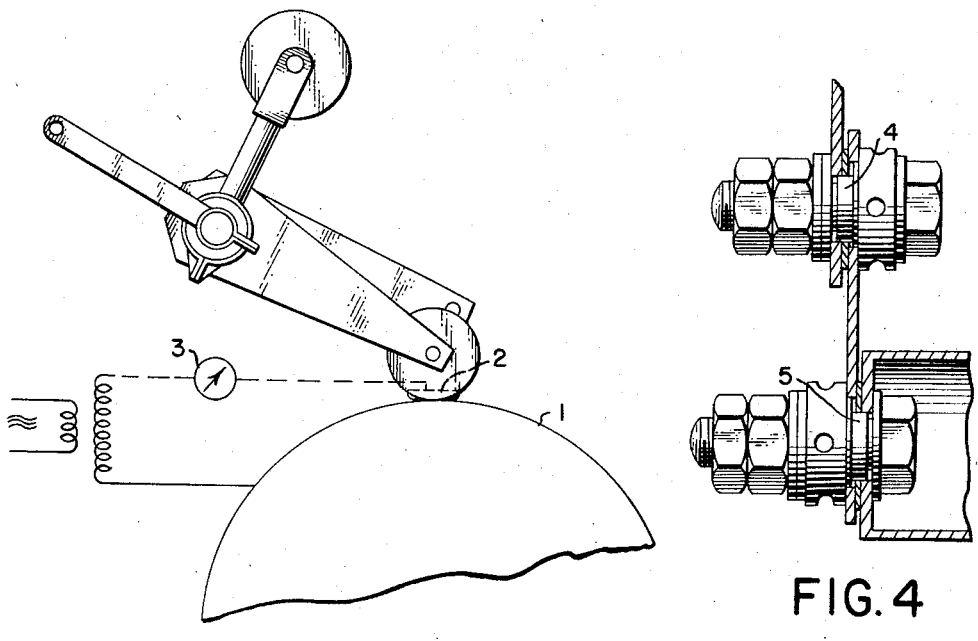
FIG. 3
FIG. 4

United States Patent Office 2,870,403
Patented Jan. 20, 1959

2,870,403

DEVICE FOR DIELECTRICALLY MEASURING THE THICKNESS OF MOVING WEBS OF MATERIAL

Paul Lippke, Neuwied (Rhine), Germany

Application May 6, 1953, Serial No. 353,319

Claims priority, application Germany May 19, 1952

4 Claims. (Cl. 324—61)

In the production of paper, card board, cellulose, films, plastics, and other materials which are produced in continuous webs, it is very desirable to ascertain the thickness of the web as soon and as quickly as possible. Up to the present this has been very difficult owing to the fact that at the time in which the thickness should be measured, the material of the web usually is still in a condition which does not allow of carrying out such measuring by mechanical means. Moreover, the velocity at which the web passes through, or out of, the machine is so great, that the application of mechanical means is practically impossible, and the sensitiveness of the web surface is so great that bodily contacts therewith must be avoided. For this reason dielectric devices have already been proposed for measuring the thickness of such webs of material by ascertaining the dimensions of a condenser after the introduction of the web as a dielectric. These devices, however, suffer various deficiencies, so that exact measurements can not be obtained.

The invention, therefore, has for its main object the provision of a new dielectric measuring device and a method for ascertaining the thickness of webs, sheets, or films of material by altering the capacity of a condenser, in which the construction and arrangement of the condenser shall be such as to enable measurements to be obtained under any practical conditions which shall be reliable and repeatable whenever and as often as may be required.

Another object of the invention is the provision of a dielectric measuring device in which changes in the position of the condenser will not affect the accuracy of the measured results, and which will respond with particularly reliable certainty to gaps or clearances of less than one thousandth part of a millimetre.

A further object of the invention is the prevention of contact taking place between the web and the condenser-plates, however small the respective clearance may be.

With these and other objects in view the invention consists in a dielectric measuring device of the type referred to, in which the condenser plates sare constituted by a roller, for one part, and by one or more condenser plates of substantially known type for the other part, whereby the gap between these two condenser parts is partly to be filled by the thickness of the web of material passing between them.

A particular advantage of an arrangement of the kind just referred to rests in that rollers, such as can be used for the purposes of the invention, are usually provided in most of the drying machines and in that these rollers may be used directly as a condenser plate for the carrying out of the invention. If rollers of the said type are not already provided, they can easily be built into the machine if desired.

The invention avoids also other difficulties, such for instance as existed in the introduction of the webs of material into the condenser, which made it very difficult to reestablish the same width of gap as before. The invention provides simple and efficient means for eliminating this drawback, so as to reestablish any size of gaps without having to resort to difficult or tedious adjustments.

The invention, furthermore, is differentiated from the previous devices of this kind in that the measurements can be taken simultaneously over the whole width of a web, whereas in the present devices they could be taken only at one place or at always the same strip of the material.

The invention will be better understood by rfeerence to the accompanying drawings in which a preferred embodiment of the same is illustrated by way of example. In these drawings:

Fig. 2 is a similar front elevation of a condenser having only one feeler.

Fig. 3 is a side elevation of a condenser shown in Figs. 1 and 2.

Fig. 4 represents a constructional detail.

Figure 1:
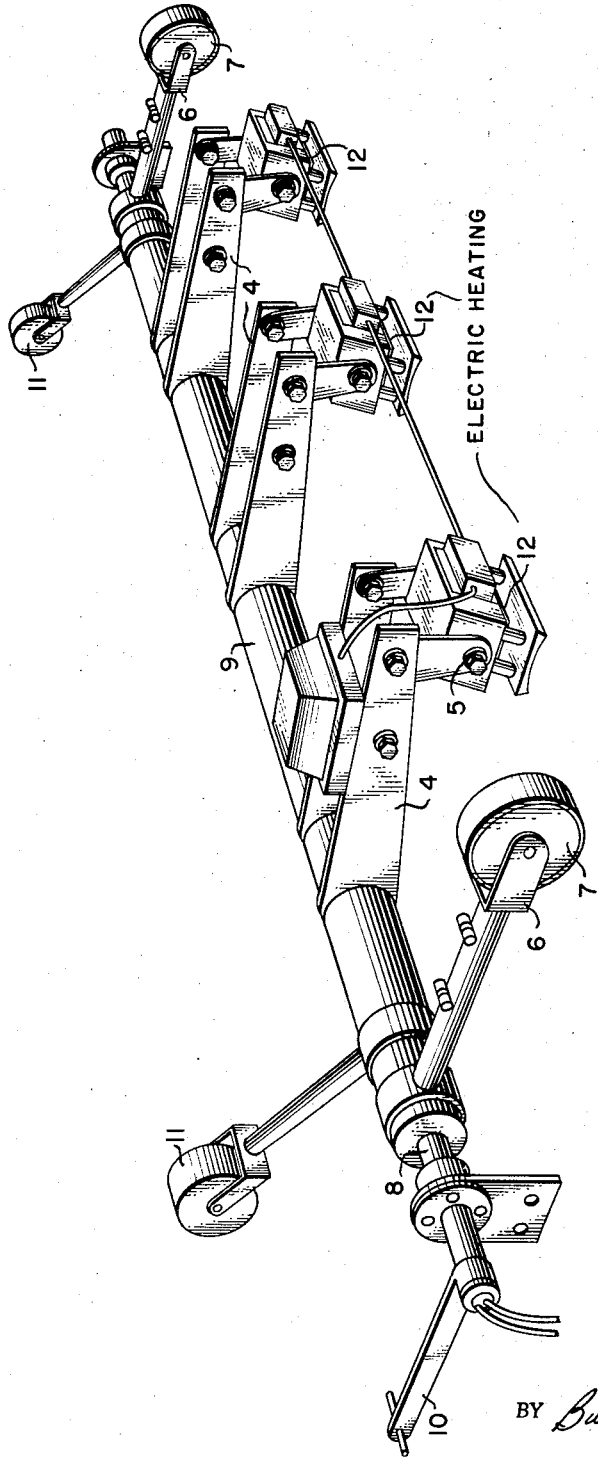
Fig. 1 is a front elevation of a condenser in accordance with the invention in which a plurality of feelers are provided.

Measuring devices for ascertaining the thickness of materials of the type aforesaid usually consist of a suitable condenser between the plates of which the material to be tested is passed. Such condensers form a part of an oscillation circuit of usually high frequency, which is provided with gauges or measuring devices which are capable of indicating the most minute changes in the capacity of the condenser. A disadvantage, however, of such condensers lies in the fact that not the slightest changes in the position of the material within the condenser can be allowed to take place, as otherwise no accurate results will be obtained. It is very difficult to maintain a uniform gap between the plates in condensers of the said kind, which is less than, for example, the thousandth part of a millimetre, as even the slightest mechanical or thermal influences will produce comparatively large changes in the distance of the condenser plates from each other. The measured results, in such cases, are inaccurate and, therefore, unreliable. Also the free passage of the material between the condenser plates is very difficult to maintain. Contact with the material of one or the other condenser plates can hardly be avoided because of the distance between the two plates must of necessity be very small.

With the purpose of avoiding these deficiencies in condensers for dielectric measurements the invention provides a novel construction, in which one of the condenser parts consists of a roller and the other of one or more plates of substantially usual construction as can best be seen from Fig. 3 of the drawing.

The condenser in accordance with the invention and which comprises the support roller 1 and the plate or plates 2 is provided with electrical energy from a high frequency circuit in substantially known manner. The gap between the two parts of the condenser is partly filled up by the material which passes over the roller 1. The changes in the capacity which result from the varying thickness of the material can be read off from the indicator 3. The fact of the material being guided directly over and in contact with the roller constitutes the most favorable condition for the measuring, namely an accurately fixed position of the web of material. As most drying machines are already provided with rollers of this kind, the advantage is incidentally obtained that the rollers can be used directly in the carrying out of the invention. If the machine has no such rollers, they can easily be fitted.

The difficulty in maintaining the correct distance between the condenser plates of the known devices is increased by the necessity of either having to remove the condenser out of its operating position when a new web is to be introduced, and to return it after such insertion, or in that the condenser plates must be made movable one in relation to the other, in order to temporarily increase the gap for the introduction of the new material. In both cases it is very difficult to reestablish the former size of gap between the two plates. The invention avoids these difficulties in the following manner:

The condenser plates 2 are mounted by means of arms 4 to a carrier bar 8 which is positioned across the web of material to be tested. The condenser plates are provided with joints having eccentric screws 5 by means of which they can be so adjusted as to be, over their whole length, concentric with and at even distance to the circumference of the roller. Also provided on the carrier bar 8 are arms 6 to which guide rollers 7 are fitted which are adapted to bear on the surface of the roller 1. In order to prevent distortions under the influence of temperature the arms 6 are made of the same material and of the same dimensions as the arms 4. The bar 8 is turnable in bearings 9 so that the entire structure can be turned about the axis of the bar 8 by means of a hand crank or lever 10. Weights 11 are provided which partly assist in the turning of the device, while in their operative position they assist in exerting a bearing pressure on the rollers 7 and to thereby move the entire arrangement quickly into its uniform working position. Owing to the rotations of the roller or cylinder 1, any static friction between the condenser plate or plates 2 and the cylinder 1 in the final regulation of the gap is avoided. In spite of the great simplicity of the arrangements, the distance between the condenser plates can thus always be reestablished, after inserting a new web for example, by just swinging the condenser plates 2 out of and back into their working position.

It is a further disadvantage of the known types of dielectric thickness measuring devices that measurements can be taken at only one point, or along a small strip of the web of material respectively, and the invention provides for the elimination also of this disadvantage. As shown in Fig. 1, several condenser plates 2 are arranged side by side over the whole length of the bar 8, which is sufficiently strong to bridge a comparatively great distance, in the case of wide webs for instance. The adjacent condenser plates may be connected to operate in unison, or each separately. Where the conditions of space are such as not to permit of the arrangement of a plurality of condensesr plates on a common shaft, the modification shown in Fig. 2 may be used, in which the bar 8 is supported in a long bearing 9 at only one of its ends and provided with a lesser number—only one in the example—of condenser plates.

It sometimes occurs that vapours arising from the material to be tested liquify and settle on the plates of the condenser. Such moisture has the same effect as an increase in the thickness of the material and often results in failures of measurement. According to the invention this deficiency is also eliminated in that an electric heater 12, or a hot air blower is provided, which keep the temperature above the condensation point of the vapours so that no moisture will settle on the plates.

It will be seen that the arrangement just described makes it possible to measure thicknesses of material reliably and with the additional advantage, that, once adjusted, this adjustment will remain the same under all conditions, and that measurements can be taken over the entire width of the material.

What I claim is:

1. In a device for currently ascertaining the thickness of moving webs of material by dielectric measuring having a condenser and means for indicating variations in the dimensions of the gap between the condenser plates and the said web, a rotatable cylinder for guiding a web of material through the device and forming a movable condenser plate, at least one normally stationary condenser plate above said cylinder at a distance therefrom which is slightly larger than the thickness of the web to be tested, a turnable shaft having its axis parallel to the axis of said cylinder and stretching across the said web of material, bearings for supporting the said shaft, arms extending in pairs from the said shaft, at least one pair of said arms arranged for carrying said normally stationary condenser plate so as to rest slightly above said web of material, at least one other pair of arms arranged for carrying a distance roller in contact with said rotatable cylinder outside said web of material, and screw means including an eccentric for lengthening and shortening said arms each individually in relation to the said cylinder.

2. In a device for currently ascertaining the thickness of moving webs of material by dielectric measuring having a condenser and means for indicating variations in the thickness of the gap between the condenser plates and the said web, a rotatable cylinder for guiding a web of material through the device and forming a movable plate of the condenser, a plurality of normally stationary plates above said cylinder at a distance therefrom which is slightly larger than the thickness of the web to be tested, a turnable shaft having its axis parallel to the axis of said cylinder and stretching across the said web of material, bearings for supporting the said shaft, arms extending in pairs from the said shaft arranged for carrying said normally stationary condenser plates, an electric heating device for each of said condenser plates to prevent the formation of vapours from the tested material and the subsequent condensation thereof, other pairs of arms outside the said first-named pairs of arms for carrying a distance roller each in contact with said rotatable cylinder, and screw means on each of the condenser plate carrying arms comprising an eccentric for lengthening and shortening said arms each individually in relation to the said cylinder.

3. In a device for currently ascertaining the thickness of moving webs of material by dielectric measuring having a condenser and means for indicating variations in the dimensions of the gap between the condenser plates and the said web, a revolvable cyclinder forming one plate of the condenser and serving to guide a web of material through the device, a rockable carrier stretching over the said cylinder, spaced arms extending in pairs from said carrier, a normally stationary condenser plate between at least one of said pairs of arms extending slightly above the said web of material so as to form a gap between itself and the said cylinder through which the said web is passed, a distance roller between at least one of the outermost of said pairs of arms to run on the said cylinder outside said web of material, eccentric adjusting means on each of said plate carrying arms for setting each of the said condenser plates by individual adjustment of each of its arms, bearings for the said carrier outside the said cylinder, and means for turning the said carrier together with the normally stationary condenser plates and said distance roller all simultaneously by hand toward and away from the said cylinder.

4. In a device for currently ascertaining the thickness of moving webs of material as set forth in claim 2, in which the arms for the said normally stationary condenser plates and the arms for the said distance roller are made of the same material to exclude differences in expansion and contraction.

References Cited in the file of this patent

UNITED STATES PATENTS

| 1,708,074 | Allen | Apr. 9, 1929 |
| 1,886,508 | Wierk | Nov. 8, 1932 |
| 2,058,518 | Schyster | Oct. 27, 1936 |
| 2,438,506 | Ladrach | Mar. 30, 1948 |
| 2,537,731 | Angell | Jan. 9, 1951 |
| 2,623,923 | Bower | Dec. 30, 1952 |